United States Patent
Schmezer

(10) Patent No.: US 11,955,847 B2
(45) Date of Patent: Apr. 9, 2024

(54) ELECTRIC MOTOR WITH SERVICE LIFE ESTIMATING UNIT AND VENTILATOR WITH CORRESPONDING ELECTRIC MOTOR

(71) Applicant: ZIEHL-ABEGG SE, Künzelsau (DE)

(72) Inventor: Joachim Schmezer, Niedernhall (DE)

(73) Assignee: ZIEHL-ABEGG SE, Künzelsau (DE)

( * ) Notice: Subject to any disclaimer, the term of this patent is extended or adjusted under 35 U.S.C. 154(b) by 687 days.

(21) Appl. No.: 17/260,973

(22) PCT Filed: May 29, 2019

(86) PCT No.: PCT/DE2019/200050
§ 371 (c)(1),
(2) Date: Jan. 15, 2021

(87) PCT Pub. No.: WO2020/015793
PCT Pub. Date: Jan. 23, 2020

(65) Prior Publication Data
US 2021/0265897 A1    Aug. 26, 2021

(30) Foreign Application Priority Data
Jul. 17, 2018    (DE) .......................... 102018211843.4

(51) Int. Cl.
*H02K 11/20*    (2016.01)
*H02K 9/06*    (2006.01)
*H02K 11/33*    (2016.01)

(52) U.S. Cl.
CPC ............. *H02K 11/20* (2016.01); *H02K 11/33* (2016.01); *H02K 9/06* (2013.01)

(58) Field of Classification Search
CPC .......... H02K 11/20; H02K 9/06; H02K 11/21; H02K 11/30; H02K 11/33
See application file for complete search history.

(56) References Cited

U.S. PATENT DOCUMENTS

2008/0216576 A1*  9/2008  Eckert ................... H02K 11/25
73/592
2012/0239716 A1  9/2012  Murray
(Continued)

FOREIGN PATENT DOCUMENTS

DE  602004000775 T2   11/2006
JP      2004165416 A *  6/2004
(Continued)

OTHER PUBLICATIONS

Takahashi, Machine Translation of JP2004165416, Jun. 2004 (Year: 2004).*

*Primary Examiner* — Eric Johnson
(74) *Attorney, Agent, or Firm* — FisherBroyles, LLP; Jason P. Mueller

(57) ABSTRACT

An electric motor includes a stator and a rotor which is rotatably mounted relative to the stator about a motor axis. The electric motor further includes an inclination measuring unit at least one sensor and one sensor electronics, said at least one sensor being arranged in a fixed position and orientation relative to the stator, said sensor electronics controlling said at least one sensor, and said at least one sensor being configured for generating measured values, which allow conclusions to be drawn about the spatial orientation of the sensor and thus conclusions about the spatial orientation of the electric motor. The electric motor can be part of a fan. Furthermore, there is disclosed a corresponding motor electronics configured for controlling such an electric motor.

20 Claims, 3 Drawing Sheets

(56) References Cited

U.S. PATENT DOCUMENTS

Figure 1:
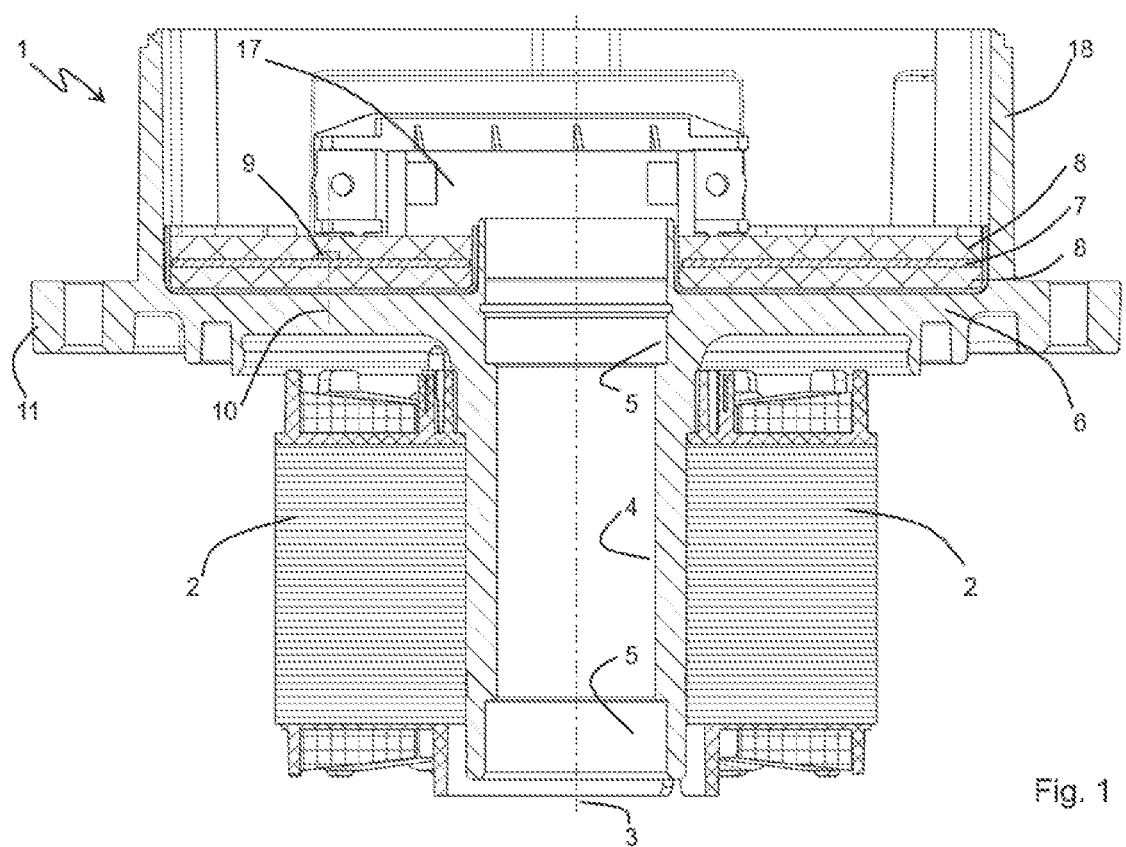

2016/0354911 A1* 12/2016 Aoki ...................... H02K 11/21
2017/0173768 A1*  6/2017 Dey, IV ................. B25B 21/02
2017/0324304 A1* 11/2017 Ito .......................... H02K 21/22
2018/0370642 A1* 12/2018 Imaizumi ................ B64C 27/08

FOREIGN PATENT DOCUMENTS

RU             118806 U1    7/2012
WO    WO-2017115668 A1 *   7/2017   ............. A63H 27/12

* cited by examiner

ELECTRIC MOTOR WITH SERVICE LIFE ESTIMATING UNIT AND VENTILATOR WITH CORRESPONDING ELECTRIC MOTOR

This application is a national stage entry under 35 U.S.C. 371 of PCT Patent Application No. PCT/DE2019/200050, filed May 29, 2019, which claims priority to German Patent Application No. 10 2018 211 843.4, filed Jul. 17, 2018, the entire contents of each of which are incorporated herein by reference.

The disclosure relates to an electric motor having a stator and a rotor rotatably mounted relative to the stator about a motor axis. The disclosure also relates to a fan with a corresponding electric motor. The disclosure also relates to motor electronics for controlling an electric motor, the motor electronics being configured for controlling windings of a stator and/or windings of a rotor of the electric motor.

Electric motors have a stator and a rotor rotatable relative to the stator. Very often, especially in the case of medium and high performance motors, the rotor is rotatably mounted, e.g., using one or more bearings. When installing such electric motors, the spatial orientation in which the electric motor will later be operated can often be selected relatively freely. This applies in particular to fans with an external rotor configuration. For example, the shaft of the electric motor can be oriented horizontally, vertically upwards, vertically downwards or in any other angular position.

The installation position of the electric motor during its operation, however, may affect some characteristics of the electric motor. The bearing load is very different due to weight forces and the bearing adjustment in different installation positions. This means that different installation positions may result in a different bearing service life. The nominal bearing service life L10h is defined in ISO 281 standard and specifies the service life that is achieved by 90% of bearings tested under the same operating conditions. The nominal service life L10h thus stands for a 10 percent failure probability. Due to the higher load as a function of the mounting position, a motor having a vertically downwardly directed motor shaft generally will have a shorter service life L10h as a motor, in which the shaft is aligned horizontally.

The installation position may also have an effect on a possible loss of lubricant. For example, bearing grease can more easily escape from the bearing in a vertical installation position so that—depending on the installation position—different bearing grease use times can result.

Another problem that arises from different installation positions concerns heat dissipation. The electric motor and any motor electronics integrated in it generate waste heat that must be appropriately dissipated. This waste heat is usually given off to the ambient air by convection via cooling surfaces or cooling fins. Depending on the installation position, the cooling surfaces or cooling fins may not be working as desired and there can be a build-up of heat. This can lead to damage to temperature-sensitive components and/or to a loss of power of the electric motor.

Furthermore, in various installation positions, moisture, for example from precipitation, can enter the motor or motor electronics. For example, if cable ducts are directed upwards, the risk of moisture ingress is higher than when cable ducts are oriented in a downward direction. In the latter case, moisture can also flow off via the connection cable and drip off in a safe place.

The last two problem areas mentioned can also arise when the motor electronics is configured as a separate assembly. In this case too, the installation position can affect how well heat can be dissipated or how high the risk of moisture ingress into the motor electronics is.

In most cases, a manufacturer of an electric motor does not know in which installation position an electric motor is installed and operated by a customer. This means there are many unknown parameters that impact the service life and the operation of the electric motor. There would be the possibility of only allowing certain installation positions of an electric motor, for example a horizontally aligned motor shaft. Especially in the case of the electric motor of a fan this is difficult to implement, since often the installation position of the electric motor cannot be freely chosen, but is dictated by an installation situation. One other way to be prepared for a variety of installation positions would be to configure the electric motor in such a way that the specified parameters are met regardless of the installation position. However, this would create an electric motor that is expensive and oversized for many installation positions.

Therefore, various embodiments relate to the configuration and development of an electric motor, a fan, and motor electronics of the type mentioned above so as to ensure an operation as safe as possible at any installation position of the electric motor or the motor electronics.

According to various embodiments, the electric motor in question is characterized by an inclination measuring unit with at least one sensor and one sensor electronics, said at least one sensor being arranged in a fixed position and orientation relative to the stator, said sensor electronics controlling said at least one sensor and said at least one sensor being configured for generating measured values, which allow conclusions to be drawn about the spatial orientation of the sensor and thus conclusions about the spatial orientation of the electric motor.

In accordance with further embodiments, a fan includes an electric motor and an impeller.

The motor electronics disclosed herein may be characterized by an inclination measuring unit having at least one sensor and one sensor electronics, said at least one sensor being arranged in a fixed position and orientation relative to the motor electronics, said sensor electronics controlling said at least one sensor and said at least one sensor being configured for generating measured values, which allow conclusions to be drawn about the spatial orientation of the sensor and thus conclusions about the spatial orientation of the motor electronics.

According to some embodiments, it has first been recognized that a limitation of the installation position or a "oversizing" of the electric motor or the motor electronics for all possible installation positions is not required if information is available on the spatial orientation of the electric motor and hence a suitable response with respect to the installation position can be established. This can be achieved by the electric motor having an inclination measuring unit, which can be used to determine the spatial orientation of the electric motor. For this purpose, the inclination measuring unit has at least one sensor and one sensor electronics, the sensor electronics controlling the sensor/sensors. The at least one sensor may be built into the electric motor or attached to the electric motor in such a way that its position and orientation relative to the stator does not change significantly. If several sensors are used, they may have a fixed spatial relationship to one another. In this way, there may be a defined relationship between the orientation of the at least one sensor and the orientation of the entire electric motor. The at least one sensor may generate measured values that allow conclusions to be drawn about the spatial orientation of the sensor/sensors. From these measured values conclusions can be drawn about the spatial orientation of the sensor/sensors and the spatial orientation of the motor.

The same can be achieved if motor electronics are equipped with an inclination measuring unit, which may be operated according to the inclination measuring unit of the electric motor. With this configuration, the installation position of the motor electronics can be determined so that it is possible to react to unfavorable heat dissipation or possible moisture ingress. If motor electronics are attached to an electric motor that is not configured to measure the installation position, the installation position of the entire electric motor can also be determined, whereby this functionality can be retrofitted by replacing the motor electronics. Most of the following configurations therefore apply accordingly to the motor electronics, which is why, in order to avoid repetition, only the configuration of the electric motor is discussed below.

The term "installation position" is generally understood to mean in which spatial orientation the electric motor is installed in the surrounding system. The installation position may be defined by the direction in which the shaft of the electric motor is oriented. Using this information, the installation position of the electric motor can in many cases be defined. Using this information, it is also possible for conclusions to be drawn about the load on the bearings and a loss of lubricant, if any. This information then permits the bearing service life to be calculated in advance, the service life of the grease to be calculated in advance, the forces that are actually acting to be calculated, or maintenance intervals to be adjusted. In addition, the installation position can be defined by an angle by which the motor is rotated about the motor axis, the motor axis being the axis about which the rotor rotates. This additional dimension of the installation position can be relevant, for example, to calculate the probability of ingress of moisture into the motor or to calculate any unfavorable heat dissipation, if any. A third dimension of the installation position could be the angle by which the electric motor is rotated about an axis perpendicular to the motor axis or about an axis parallel to the earth's gravitational vector. Since this direction is not important for most of the operating parameters of the electric motor, this third dimension of the installation position can be dispensed with in most applications. Overall, thus, the spatial orientation in which the electric motor is installed is defined by a one-dimensional, a two-dimensional, or a three-dimensional quantity.

The sensor electronics can also be constructed in different ways. In the simplest case, the sensor electronics can be current limited, e.g., using a ballast resistor. In capacitively measuring systems, the sensor electronics may also include a resonant circuit with which the sensor is supplied with an AC voltage. What the sensor electronics looks like in practice will depend on the sensor used. If the sensor has several partial sensors or several sensors are used, the sensor electronics can control all partial sensors or all sensors together. However, individual parts of the sensor electronics can also be used individually for one of the partial sensors.

In addition to controlling the sensor, the sensor electronics can also conduct processing of the sensor signals. This processing could include digitizing an analog signal. Depending on the sensor used, it is also conceivable that a spatial orientation of the sensor cannot be read directly in the sensor signals. In such a case, the sensor electronics could evaluate the sensor signals in such a way that values for the spatial orientation of the sensor can be output. This short, exemplary list, shows how flexible and different the sensor electronics can be.

The defined spatial relationship between sensor and stator can also be formed in different ways. Thus, the sensor may be arranged on a circuit board while the circuit board is screwed to a stator bushing (for example, in an electronics housing formed there). Since the stator is fixedly connected to the stator bushing, a defined and fixed spatial relationship between the sensor and the stator is formed in this way, even if the circuit board could be slightly deformed by vibration. A defined spatial relationship would also be understood to mean, when the sensor is embedded in a casting mass which is deformable only slightly. Because in this case too, the position and spatial orientation of the sensor relative to the stator may remain largely fixed, since the sensor is usually only deflected in a defined manner and will return to its starting position. However, the sensor can also be part of a sensor arrangement which is arranged, for example, in a bearing tube. Here, too, there is a defined spatial relationship between the sensor and the stator. Corresponding statements also apply if the sensor is integrated in motor electronics that is flanged to a motor housing. Since the motor housing may be in a defined and fixed spatial relationship to the stator and the motor electronics may be fixedly fastened to the motor housing, a defined spatial relationship between the sensor and the stator may be obtained.

Also, the at least one sensor can be formed in various ways. In some embodiments, the sensor signals generated by the at least one sensor can be used to draw conclusions about the spatial orientation of the sensor and thus conclusions about the spatial orientation of the electric motor. However, this requirement can be met by the most diverse sensors.

In an exemplary embodiment of the at least one sensor, said sensor is formed by an inclination sensor that uses the effects of the earth's gravitational field. Such an inclination sensor works like a digital spirit level and is often constructed as a MEMS (Micro Electro Mechanical System). Depending on the number of measurable axes, an inclination sensor may provide one or two measured values, each of which indicates an angle relative to a vector of the gravitational field, wherein the directions to which the angles relate are perpendicular to each other. Since the measuring area in the case of 2-axis inclination sensors is often restricted compared to 1-axis inclination sensors, two 1-axis inclination sensors can be used instead of a 2-axis inclination sensor, in which case the two 1-axis inclination sensors may be arranged in such a way that the measurements are taken in two directions that are arranged perpendicularly to one another. Irrespective of the configuration, the angular values obtained relative to the gravitational field can be used to determine the spatial orientation of the sensor(s), since the vector of the gravitational field always points to the center of the earth.

In another exemplary embodiment of the at least one sensor, the latter includes a 3-axis vibration sensor. It has been recognized that an electric motor vibrates characteristically depending on the installation position. This is due to the fact that the bearings and other parts of the electric motor are stressed differently by the weight depending on the installation position and thus may vibrate differently. If these vibrations are measured in three perpendicular directions, the installation position of the electric motor can be determined. For this purpose, the sensor signals of the individual axes may be analyzed accordingly and compared with reference values. These reference values can be determined by calibration measurements during the startup procedure of the electric motor. For this purpose, the electric motor would be operated in different but known spatial orientations and the vibrations measured in each case. In doing so, a speed dependency can also be recorded. Alternatively, the reference values can also come from measurements of another electric motor of the same type. In any case, the measured values of the 3-axis vibration sensor allow the orientation of the 3-axis vibration sensor to be determined relative to a reference vector. In practice, this reference vector would mostly be the vector of the gravitational field.

In order to simplify the relationship between the orientation of the electric motors and the orientation of the at least one sensor it is recommended that the sensor be connected to the electric motor in such a manner that a measurement axis of the inclination measuring unit is arranged parallel to the motor axis. If the at least one sensor includes a 2-axis inclination sensor, for example, one of the measuring axes of the sensor could be parallel to the motor axis.

In addition or alternatively, a further measuring axis of the inclination measuring unit may be arranged substantially parallel or perpendicular to a reference plane of the electric motor, wherein the reference plane can be formed by different planes and may extend parallel to the motor axis. In certain embodiments, the reference plane may have a defined position relative to the electric motor. For thereby, the position and spatial orientation of other elements of the electric motor, such as, for example, cable ducts or the position of cooling surfaces or fins can be determined. A reference plane may be formed by a connection plane of the electric motor, the connection plane being the area of the electric motor to which the supply cable(s) for the electric motor is/are connected. Often these connections have cable ducts whose axes are parallel to one another. The connection plane would then be the plane that is perpendicular to the axes of the cable ducts.

Often electric motors have a motor electronics, which generate supply voltages for the windings of the stator and/or rotor. This motor electronics can contain, for example, the power section of the inverter and/or the control electronics. In this case, the motor electronics is arranged in an electronics housing or a separate housing is attached to the electric motor. In both cases, the motor electronics may have a defined position and spatial orientation relative to the electric motor. In one embodiment, this fact is used to integrate the inclination measuring unit in the motor electronics. This can mean that the inclination measuring unit may be arranged on the circuit board of the motor electronics. This configuration offers the advantage that an energy supply is already available for the inclination measuring unit. In addition, parts of the motor electronics can be used concomitantly. For example, a microprocessor of the motor electronics can carry out calculations or a memory of the motor electronics can store measured values.

In another configuration, the inclination measuring unit is arranged in a bearing tube, the bearing tube enclosing at least parts of the shaft of the electric motor and on which at least one bearing receiving area for bearings of the shaft is formed. Such a configuration is described in more detail in DE 10 2018 211 833 A1, to which reference is hereby expressly made.

In a development, the inclination measuring unit includes an evaluation unit which is configured to determine information about the spatial orientation of the at least one sensor and/or the electric motor from measured values of the at least one sensor. In this case, the evaluation unit can be configured in various ways. It is conceivable that the evaluation unit uses a look-up table in which relationships between measured values and a spatial orientation are established. This look-up table can have been generated during a calibration measurement of the electric motor. In many cases, however, the installation position does not have to be determined with an accuracy of a few degrees or less, so that any installation tolerances of the inclination measuring unit relative to the stator are mostly of minor importance. In these cases, a look-up table of a structurally identical electric motor can be made available to the evaluation unit. However, the evaluation unit can also carry out calculations based on the measured values. In the simplest case, it can include an interpolation or a calculation of an approximation polynomial. However, elaborate calculation can be carried out also. For example, if the inclination measuring unit includes one or more vibration sensors, the evaluation unit can carry out a frequency analysis in the form of an FFT (Fast Fourier Transform).

The information about the spatial orientation of the at least one sensor and/or the electric motor, which is determined by the evaluation unit, may include a data record which specifies angles with respect to a reference direction. In the simplest case, the reference direction is formed by a vector of the gravitational force. In this way, for example, the inclination of the motor axis relative to the gravitational field and the rotation of the electric motor about the motor axis relative to a reference plane can be determined. If further information on the spatial orientation of the electric motor is to be obtained, a second reference direction may be necessary, which is formed, for example, by the earth's magnetic field. The data record indicates how the electric motor deviates from this reference direction (or from the reference directions). Depending on how exactly the orientation of the electric motor is to be specified, the data record can be one-dimensional, two-dimensional or three-dimensional.

In some cases it may be sufficient to provide qualitative statements about the spatial orientation of the electric motor. Therefore, the information about the spatial orientation of the at least one sensor and/or the electric motor can additionally or alternatively include an evaluation number. This evaluation number can indicate how favorable or unfavorable the currently determined spatial orientation is. In one embodiment, the evaluation number may be a 0 and a 1, wherein for example, a 0 indicates that the electric motor in an installation position that does not allow safe operation. The evaluation number can also be a natural number, for example between 1 and 10, with 1 being unfavorable and 10 being favorable. This information can also be used to draw the user's attention to the unfavorable or even impermissible installation position. For example, an LED (Light Emitting Diode) could indicate that safe operation is not possible. In this way, for example, when the electric motor is started up for the first time, it can be seen if there is a risk of water penetrating through a condensing water opening or a cable duct into the electric motor due to a non-intended installation position. An unfavorable installation position can also exist if heat dissipation can no longer be ensured to a sufficient extent as a result of the installation position.

Since electric motors are usually installed in a fixed orientation, the inclination measuring unit can measure the spatial orientation when the electric motor is first started up. This measured value can be stored in a memory and accessed for future operation. However, it is also possible that the spatial orientation is recorded repeatedly.

This repeated recording can take place in case of special events or at periodic intervals. A special event can, for example, include the re-activation of the electric motor. If the spatial orientation is recorded periodically, the interval length can depend on external factors. Daily recording would be conceivable, for example, if no significant spatial changes in orientation are to be expected. When the electric motor is installed in a moving system, for example, in a wind turbine, recording at a much shorter interval length may be appropriate. Several acquisitions per second can even be useful here.

The inclination measuring unit may have a memory that is configured for storing measured values of the at least one sensor and/or for storing processed measured values of the at least one sensor. The memory can be configured in various ways. In order to avoid data loss in the event of a power failure, however, the memory may be configured as a non-volatile memory. Such non-volatile memory, may be, for example, a flash memory, an EEPROM (Electronically Erasable Programmable Read-Only Memory), an NVRAM (Non-Volatile Random Access Memory) or another semiconductor memory.

In one development, the inclination measuring unit may additionally have a communication interface through which a current measured value, measured values stored in a memory of the inclination measuring unit and/or information derived from the measured values can be transmitted. The communication interface can be constructed in various ways. Wireless transmission methods, such as radio-based or optical methods, can be used as well as wired methods. The transmission can be analog or digital, serial or parallel, packaged, or in direct connections. The transmission technology used in each case is dependent on the respective use scenario. By way of example, but not limiting, reference is made to Bluetooth, Bluetooth LE (Low Energy), NFC (Near Field Communication), Ethernet, RS485, Modbus, Profibus, CAN bus or USB (Universal Serial Bus).

The communication interface may be configured in such a way that the communication, for example, can be read out in case of service, to be able to understand better the cause of the failure.

However, the communication interface may also be connected communicatively to motor electronics. In this case, the motor electronics can be configured to make adjustments to a control of the windings of the stator and/or rotor based on measured values received through the communication interface and/or derived information. For example, a measured value can indicate a very unfavorable installation position that will result in damage to the motor. This can be due, for example, to the fact that adequate heat dissipation from temperature-sensitive components cannot be sufficiently ensured as a result of the installation position. In this case, the motor electronics can control the motor with lower power or adjust the control objectives, for example for smooth running.

In additional or alternatively the communication interface may be connected communicatively to a network facilitating communication with the inclination measuring unit. The network (or parts of it) may include a wide area network that is cable or radio-based. This network can network, for example, a "4.0 industry" environment or a IoT environment (Internet of Things). In this case, measured values can be transmitted directly, via a data aggregator or via a gateway to a monitoring unit. The data received can then be further evaluated at the monitoring unit. It is conceivable that the maintenance intervals for the electric motor are configured to the current installation position so that emerging damages are prevented. In this way it can be prevented that an increased risk of bearing grease loss as a result of the installation position leads to destruction of the bearing.

The electric motor can additionally have an estimation unit that is configured to estimate a service life. As already stated, the installation position affects the service life of individual components of the electric motor. These lifetimes can be calculated in advance by the estimation unit. Such service life that can be calculated in advance can be the service life of a bearing of the electric motor, of a temperature-sensitive component of the electric motors and/or of bearing lubricant. Depending on the installation position, there are different loads on the bearing(s). It may be determined how bearings behave under a certain stress and how the L10h value changes as a result that the service life of the bearing(s) can be estimated and maintenance can be initiated, for example, when the end of service life is approaching. With regard to the service life of temperature-sensitive components, there is a particular effect when an unfavorable installation position interferes with the dissipation of heat and as a result the cooling of the components can no longer be sufficiently ensured. Here, semiconductor switches may be implemented for the generation of the AC voltages for the windings of the stator/rotor. Higher temperatures of the components reduce their service life, which can also be estimated. The service life of the bearing lubricant is associated with the risk that the lubricant exits the bearings as a function of the installation position. Here, the grease service life can be calculated in advance and used to adjust maintenance intervals.

The electric motor can be built in different ways, such as for medium and high performance electric motors (i.e., from about 100 W to 15 kW). In an example configuration, the electric motor is an EC motor (Electronically Commutated Motor) which does not have a commutator and in which a variable rotating field is fed into the stator and/or rotor windings. In a further embodiment, the electric motor is constructed in an external rotor design, i.e., the rotor is arranged around the stator.

The electric motor may be incorporated into a fan. In this case, the shaft of the electric motor is connected to an impeller and drives it.

Figure 2:
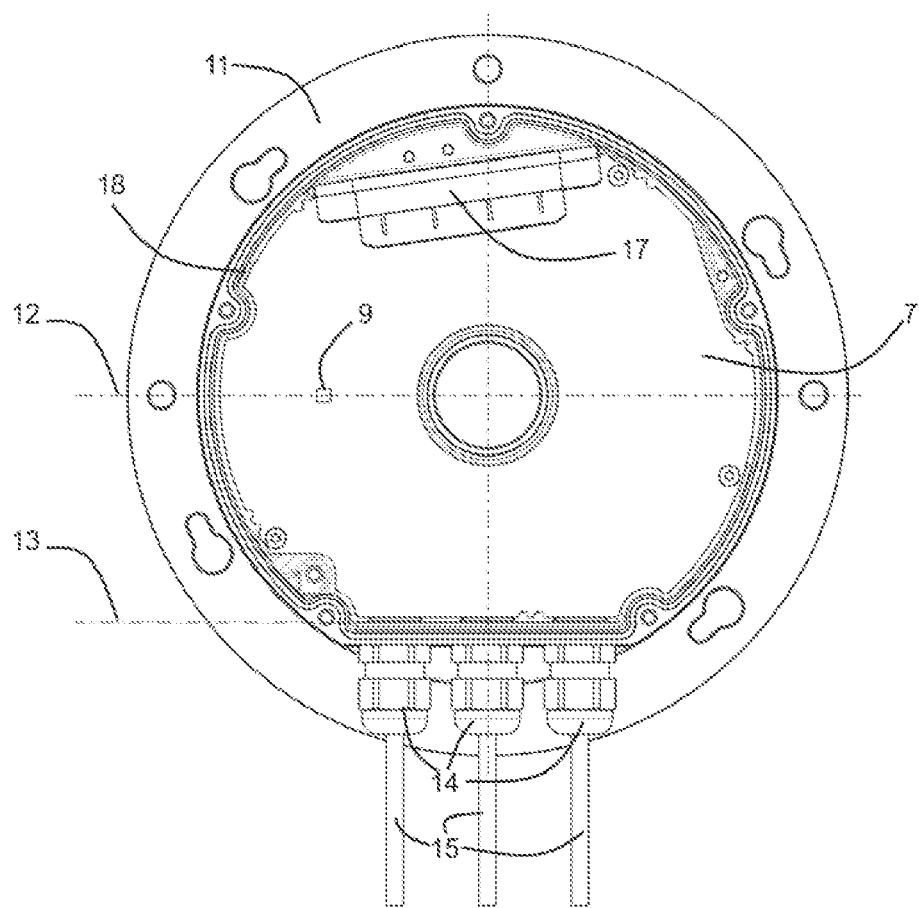
Figure 3:
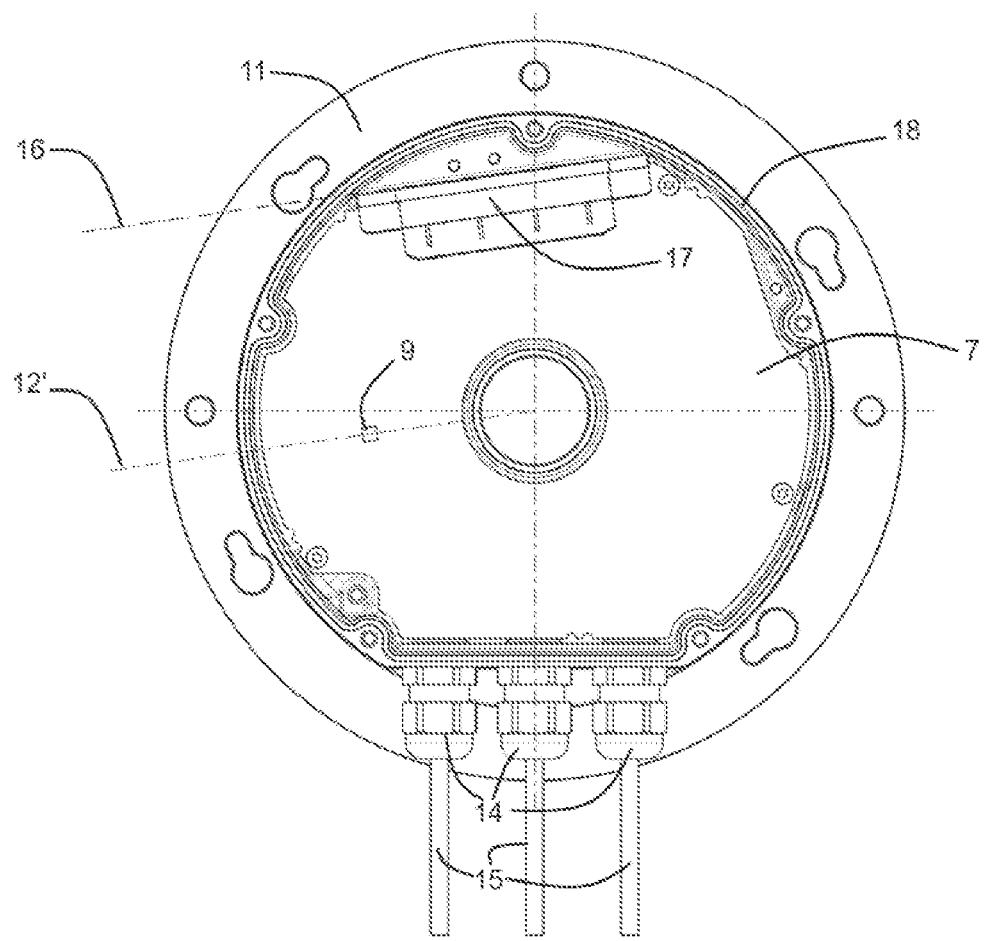

There are now various possibilities for designing and developing the teaching of the present disclosure in an advantageous manner. For this purpose, reference is made, on the one hand, to the claims and on the other hand, to the following explanation of exemplary embodiments with reference to the drawings. In connection with the explanation of the exemplary embodiments with reference to the drawing, generally advantageous configurations and developments of the teaching are also explained. In the drawing, FIG. 1 shows a section through a stator of an electric motor that is constructed in external rotor design, FIG. 2 shows a schematic drawing of the motor electronics of an electric motor, wherein the axis of the inclination sensor is arranged parallel to the connection plane, FIG. 3 shows a schematic drawing similar to FIG. 2, the axis of the inclination sensor being arranged approximately parallel to the linking plane of the power semiconductor, FIG. 1 shows a section through an electric motor 1, the rotor of the electric motor not being shown for the sake of clarity. In this case, the electric motor has an external rotor configuration. This means that the stator 2 is arranged at a motor axis 3 and the rotor (not shown in FIG. 1) is arranged about the stator 2. At the motor axis 3, a bearing tube 4 is formed, at the longitudinal ends of which a bearing receiving area 5 is formed, with the bearing tube 4 and bearing receiving areas 5 being formed in a stator bushing. In the bearing receiving areas 5, bearings are received via which a shaft of the electric motor, also not shown, is rotatably mounted. The stator bushing 6 is formed by an aluminum component, at one end of which the bearing tube 4 and at the other end of which an electronics housing 18 for receiving the motor electronics is formed. Since the electric motor 1 is an EC motor, a motor electronics is required that generates and outputs a supply signal for the stator and/or rotor windings. In the exemplary embodiment illustrated in FIG. 1 this motor electronics is arranged in the electronics housing 18. A circuit board 7 of the motor electronics is shown in FIG. 1, which carries components of the motor electronics. An elastic casting mass 8 is arranged above and below the circuit board 7, so that the motor electronics is vibration-damped in relation to the electronics housing 18. Simultaneously, a fixed position and orientation of the circuit board 7 relative to the stator 2 as well as to the components arranged thereon. An inclination sensor 9 which is part of the inclination measuring unit is arranged on the circuit board 7. A measuring axis 10 of the inclination sensor is arranged in parallel to the motor axis 3.

FIG. 2 shows a view in the electronics housing 18 of the electric motor 1. Clearly seen is the flange edge 11 which is arranged around the electronics housing 18. Circuit board 7 carrying the inclination sensor 9 is arranged in the electronics housing 18. Another measuring axis 12 forming a second measuring axis of the inclination sensor 9 is shown at the inclination sensor 9. In this exemplary embodiment, said measuring axis 12 is arranged parallel to a connection plane 13 of the electric motor, which, in this exemplary embodiment, forms a reference plane. In this case, the connection plane 13 is formed by the surface of the stator bushing to which cable ducts 14 are attached. The cable ducts 14 may provide a connection to the motor electronics on the circuit board 7 via connection cables 15.

FIG. 3 shows a very similar exemplary embodiment as FIG. 2, wherein the reference plane for the alignment of the further measuring axis 12' in this exemplary embodiment is formed by a linking plane 16 for the power semiconductor 17 of the electric motor. In the motor electronics of the exemplary embodiment according to FIG. 3, the linking plane 16 is rotated by approximately 8° with respect to the connection plane 13. The linking plane 16 can also form a reference plane, parallel to which a measuring axis 12' of the inclination sensor 9 can be arranged.

Below, some functions and example embodiments of the electric motor are summarized in brief:
1. Determining the service life of components on the electronics by detecting the spatial location of heat sources and heat sinks/cooling bodies and thus the convection/heat dissipation of the components, whereby, for example, position-dependent power adjustment is possible and an extension of the service life of temperature-sensitive components can be achieved.
2. Calculation of the bearing service life in advance by detecting the installation position, thus different bearing loads/bearing seat loads.
3. Calculation in advance of the grease use life by detecting the installation position, wherein a vertical installation position will result in a different factor in the grease use life calculation. As a result, determination and output of maintenance intervals.
4. Identification of a non-intended installation position of the electric motor. By identifying the spatial position of the cable duct and the condensing water holes, a warning message at start-up can be generated. If a failure occurs, water ingress into the motor or the electronics can be traced, and damage diagnosis can be made easier.
5. Detecting the installation position and from this determining the actual forces acting on components of fans for damage diagnosis in case of component failure, or detection of changes in position of motors/fans that rotate together in systems, for example in wind turbines.

With regard to further advantageous configurations of the electric motor, in order to avoid repetitions, reference is made to the general part of the description and to the accompanying claims.

Finally, it should be explicitly noted that the above-described exemplary embodiments of the electric motor only serve to explain the claimed teaching, but do not limit it to the exemplary embodiments.

LIST OF REFERENCE NUMERALS 1 electric motor (rotor not shown)
2 stator
3 motor axis
4 bearing tube
5 bearing receiving area
6 stator bushing
7 circuit board
8 casting mass
9 inclination sensor
10 measuring axis of the inclination sensor
11 flange edge
12, 12' further measuring axes
13 connection plane
14 cable ducts
15 connection cable
16 linking plane
17 power semiconductor
18 electronics housing

The invention claimed is:

1. An electric motor comprising:
a stator;
a rotor rotatably mounted about a motor axis relative to the stator; and
an inclination measuring unit comprising:
    a sensor located in a fixed position and orientation relative to the stator;
    sensor electronics configured to control the sensor, wherein the sensor is configured to generate measured values that allow conclusions to be drawn about a spatial orientation of the sensor and about a spatial orientation and an installation position of the electric motor, wherein the installation position is defined by the spatial orientation the electric motor is installed in a surrounding system; and
    an estimating unit configured to estimate a service life, depending on the installation position of the electric motor.

2. The electric motor of claim 1, wherein the sensor comprises an inclination sensor configured to determine an orientation of the inclination sensor relative to a vector of a gravitational field based on the earth's gravitational field.

3. The electric motor of claim 1, wherein the sensor comprises a 3-axis vibration sensor configured to measure vibrations of the electric motor in three directions, the measured vibrations allowing conclusions to be drawn about an orientation of the 3-axis vibration sensor relative to a reference vector.

4. The electric motor of claim 1, wherein a first measuring axis of the inclination measuring unit is arranged parallel to the motor axis.

5. The electric motor of claim 1, wherein a second measuring axis of the inclination measuring unit is arranged parallel or perpendicular to a reference plane of the electric motor, the reference plane being defined by a connection plane of the electric motor or formed by a linkage plane for power semiconductors.

6. The electric motor of claim 1, wherein the inclination measuring unit is integrated in motor electronics, the motor electronics located in an electronics housing and configured to control windings of at least one of the stator and the rotor.

7. The electric motor of claim 1, wherein the inclination measuring unit is arranged in a bearing tube surrounding at least a portion of a shaft of the electric motor, the bearing tube comprising a bearing receiving area for bearings of the shaft.

8. The electric motor of claim 1, wherein the inclination measuring unit comprises an evaluation unit, the evaluation unit configured to determine information about at least one of the spatial orientation of the sensor and the electric motor using measured values of the sensor.

9. The electric motor of claim 8, where the information comprises a set of data indicating angles with respect to a reference direction.

10. The electric motor of claim 8, wherein the information comprises an evaluation number evaluating a currently determined spatial orientation.

11. The electric motor of claim 1, wherein the inclination measuring unit is configured to determine the spatial orientation of the electric motor each time the electric motor is switched on.

12. The electric motor of claim 1, wherein the inclination measuring unit is configured to periodically determine the spatial orientation of the electric motor.

13. The electric motor of claim 1, wherein the inclination measuring unit comprises a memory configured to store at least one of the measured values and processed measured values.

14. The electric motor of claim 1, wherein the inclination measuring unit comprises a communication interface configured to transmit at least one of a current measured value, measured values stored in a memory of the inclination measuring unit, and information derived from the measured values.

15. The electric motor of claim 14, wherein the communication interface is communicatively connected to motor electronics, the motor electronics configured to control windings of the stator or the rotor based on at least one of the measured values received via the communication interface and the information derived from the measured values.

16. The electric motor of claim 14, wherein the communication interface is communicatively connected to a wide area network.

17. The electric motor of claim 1, wherein the estimating unit is configured to estimate a service life of at least one of a bearing, a temperature sensitive component, and a bearing lubricant.

18. The electric motor of claim 1, wherein the electric motor comprises an electronically commutated motor or an external rotor design.

19. A fan comprising the electric motor of claim 1, the fan comprising an impeller connected to a shaft of the electric motor.

20. Motor electronics for controlling the electric motor of claim 1, the motor electronics configured to control windings of at least one of the stator and the rotor, wherein the sensor is located in a fixed position and orientation relative to the motor electronics, the sensor being configured to generate measured values that allow conclusions to be drawn about a spatial orientation and an installation position of the electric motor and/or of the motor electronics wherein the installation position is defined by the spatial orientation the electric motor and/or the motor electronics is installed in the surrounding system, and an estimating unit configured to estimate a service life depending on the installation position of the electric motor and/or motor electronic.

* * * * *